US005926591A

United States Patent [19]
Labeye et al.

[11] Patent Number: 5,926,591
[45] Date of Patent: Jul. 20, 1999

[54] OPTOMECHANICAL ACCELERATION SENSOR

[75] Inventors: Pierre Labeye; Frédéric Revol-Cavalier, both of Grenoble, France

[73] Assignee: Commissariat a l'Energie Atomique, Paris, France

[21] Appl. No.: 08/837,852

[22] Filed: Apr. 22, 1997

[30] Foreign Application Priority Data

May 10, 1996 [FR] France ..................................... 96 05842

[51] Int. Cl.⁶ .......................................................... G02B 6/26
[52] U.S. Cl. .............................................. 385/25; 359/320
[58] Field of Search .................................... 359/320, 618; 385/16, 17, 20, 22

[56] References Cited

U.S. PATENT DOCUMENTS 5,612,815  3/1997  Labeye et al. ........................... 359/320

FOREIGN PATENT DOCUMENTS 2 660 444  10/1991  France .
41 36 510   5/1993  Germany .
42 30 087   3/1994  Germany .

OTHER PUBLICATIONS

Patent Abstracts of Japan, vol. 8, No. 286 (P–324), Dec. 27, 1984, JP–59–151025, Aug. 29, 1984.

Optics Communications, vol. 110, No. 3/4, pp. 410–424, Aug. 15, 1994, R. M. Jenkins, et al., "A Novel Waveguide Mach–Zehnder Interferometer Based on Multimode Interference Phenomena".

Applied Physics Letters, vol. 27, No. 6, Sep. 15, 1975, pp. 337–339, R. Ulrich, et al., "Self–Imaging in Homogeneous Planar Optical Waveguides".

Journal of the Optical Society of America, vol. 68, No. 5, May 1978, pp. 583–592, R. Ulrich, et al., "Resolution of Self–Images in Planar Optical Waveguides".

Applied Optics, vol. 17, No. 24, Dec. 15, 1978, pp. 3990–3998, M. D. Feit, et al., "Light Propagation in Graded–Index Optical Fibers".

Optics Letters, vol. 16, No. 9, May 1, 1991, pp. 624–626, G. Hadley, "Transparent Boundary Condition for Beam Propagation".

IEEE Journal of Quantum Electronics, vol. 26, No. 8, pp. 1335–1339, Aug. 1990, Youngchul Chung, et al., "An Assessment of Finite Difference Beam Propagation Method".

The National Optics Institute Bulletin of Canada, 4 pgs, Nov. 1991, "The National Optics Institute Introduces BPM_CAD".

*Primary Examiner*—Akm E. Ullah
*Attorney, Agent, or Firm*—Oblon, Spivak, McClelland, Maier & Neustadt, P.C.

[57] ABSTRACT

An optomechanical sensor for measuring or detecting an acceleration or a vibration in at least one direction. The sensor has a frame, and a flexible beam having two ends. A first end is attached to the frame and a second end is mobile in the at least one direction, in response to an acceleration movement of the frame. The flexible beam includes an optical guiding structure having an input and an output. The frame has N light collection elements, where N is an integer $\geq 2$. The frame also includes a multi-mode coupler having an input facing the output of the optical guiding structure and N outputs, the coupler coupling an optical signal at the output of the optical guiding structure to the N light collection elements. The multi-mode coupler may also transform an input light beam having a maximum into a distribution having N maxima at the output of the coupler.

26 Claims, 10 Drawing Sheets

OPTOMECHANICAL ACCELERATION SENSOR

TECHNICAL FIELD AND PRIOR ART

The invention relates to the optomechanical field. In particular, the invention concerns devices associating integrated optical guides with a mechanical structure etched in the same material. These devices are of particular interest in the metrology field.

Optomechanics results from recent advances in the broader field of microtechnologies, although the fields of integrated optics and micromechanics, considered separately, are well developed.

In the field of optomechanical sensors, use is made of the mechanical displacement of the end of an optical guide facing the end of one or more fixed optical guides. It is the physical phenomenon to be measured (acceleration, vibrations, etc.), which gives rise to said displacement of the end of the guide.

In the field of optical fibres, a very simple configuration for measuring this displacement d consists of positioning, in the manner illustrated in FIG. 1, an optical fibre 2, having a free end 4, in front of two juxtaposed optical fibres 6, 8. Each of these fibres transmits a signal $S_1$, $S_2$.

In this configuration, a signal proportional to the acceleration undergone by the sensor in electronically forming the difference $S_1-S_2$ of the two optical signals from the two output fibres is obtained. This device is simple, but causes certain problems.

When a mobile mass is subject to a static acceleration A, the displacement X of a mass induced by said acceleration A is given by the following, very simple relation:

$$X = \frac{A}{(2\pi f_0)^2}$$

in which $f_o$ is the natural resonant frequency of said mass. When the mobile mass is subject to a vibration, the displacement is also given by this formula for frequencies well below said frequency $f_o$. The displacement is much less for frequencies above said frequency $f_o$. Thus, if it is wished to have a very sensitive sensor, i.e. a seismic mass with a considerable displacement for a limited acceleration, the resonant frequency must be very low. It is then impossible to measure vibrations at high frequencies. Conversely, when it is wished to measure vibrations at high frequencies, it is necessary to have a very high resonant frequency and consequently the sensor is not very sensitive. In order to have a sensor sensitive to high frequencies, it is consequently necessary to detect extremely small displacements of the mobile mass.

The above device described in conjunction with FIG. 1 requires considerable displacements of the free end of the optical fibre. Thus, as the diameter of the optical fibres is approximately 125 µm, the minimum distance between the two cores of the output optical fibres 6, 8 is 125 µm. Thus, the device is only sensitive for relatively large displacements of the free end 4 of the optical fibre 2 and is consequently limited to low frequencies.

This device has a sensitivity limited by the relatively large diameter of the fibres, which makes it possible to move together the two output fibres to obtain a better sensitivity. Moreover, said device is very difficult to manufacture, because its performance characteristics are highly dependent on the correct positioning of the three fibres.

It is possible to produce such a sensor in integrated microoptomechanics. The sensor still functions on the same principle. The sensitivity is improved by the fact that it is possible to move together the two fixed output guides. More specifically, as the guides are produced by deposition and etching layers on a substrate, it is possible to obtain two fixed output guides much closer together and in a perfectly aligned manner with respect to the mobile guide. This gives a more sensitive sensor or which is able to measure higher frequencies.

However, this configuration also causes a problem. Thus, the two output optical guides cannot be excessively close to one another because, in this case, they would exchange light energy between them and the difference of the output signals would then no longer be proportional to the acceleration. Thus, the sensor sensitivity is once again limited.

DESCRIPTION OF THE INVENTION

The invention proposes an optomechanical device, whose structure makes it possible to improve the sensitivity compared with known devices.

More specifically, the invention relates to an optomechanical device having:

a fixed part, and a mobile part, itself having an optical guiding structure, a first fixed end connected to the fixed part and a second mobile end, said mobile part being displaceable in a first direction, the fixed part having N light collection means and a multimode coupler facing the optical guiding structure of the mobile part and making it possible to transmit an optical signal from the latter to the N light collection means.

This device avoids the problems linked with coupling between neighbouring output guides.

Compared with a device otherwise having the same characteristics for the mobile part and therefore the same resonant frequency, the presence of a multimode coupler permits, in a device according to the invention, the obtaining of a better sensitivity at the same acceleration. Thus, the device according to the invention is more sensitive to high vibration frequencies.

The multimode coupler can be a multimode waveguide, or a group of monomode guides distributed so as to be able to exchange energy, so that when the distribution of the light beam directed at the input of the coupler has a single maximum, it is possible to transform this distribution into a distribution having N (N≧2) maxima at the coupler output.

The N collection means at the coupler output can be formed by optical guides or optical fibres or by detectors and can also be formed by a combination of two or three of these means.

In the case of N detectors, each supplying a signal $S_i$ (i=1, ..., N), means can also be provided for delivering a signal representative of a combination of signals $S_i$ and e.g. a signal representative of the quantity $\Sigma \lambda_i S_i$, in which $\lambda_i$ is a weighting factor of the signal $S_i$. An interesting combination for N=2 is the signal proportional to the difference $S_1-S_2$, which is quasi-linear for relatively small displacements.

Moreover, for N=2, the signal processing means can be provided for delivering a signal representative of the quantity $S_1-S_2/S_1+S_2$, which gives a quasi-linear signal over a greater displacement range of the mobile guide.

In the case where the collection means are N optical guides, optical fibres can be provided in the extension of said output optical guides. In order to eliminate stray light, reflectors can be positioned in front of the input of one of the fibres. Moreover, the fibres can be inserted in holes in the fixed part, said holes being widened at at least one point. These widenings facilitate the supply of optical adhesive for holding the fibres.

Moreover, the light can be supplied to the mobile part by means of an input optical fibre and an input optical guide. Under these conditions, the device can also have reflectors at the output of the input optical fibre on either side of the input optical guide.

In order to obtain greater displacements of the mobile part, the latter can be weighted or ballasted, particularly at its mobile end.

In order to solve the deviation problems of said mobile part in a second direction, it is possible to provide means for compensating the deformations of said part. These means can e.g. have at least one compensating arm, said arms having an adequate flexibility in a first direction not to impede the displacement in said direction and an adequate rigidity in the second direction to limit deformations in said second direction. Various different arm shapes can consequently be envisaged (U-shaped, at right angles, straight).

The invention also relates to an optomechanical sensor incorporating a device of the type described hereinbefore.

The invention also applies to the production of an optical switch, for which purpose electrical or electromagnetic control means are added to the mobile part, as described in FR-A-2 660 444.

BRIEF DESCRIPTION OF THE DRAWINGS

The features and advantages of the invention will become more apparent from the following description of non-limitative embodiments with reference to the attached drawings, wherein:

FIGS. 14 to 15E illustrate stages in the modelling of a deformation compensating device.

DETAILED DESCRIPTION OF EMBODIMENTS OF THE INVENTION

Figure 1:
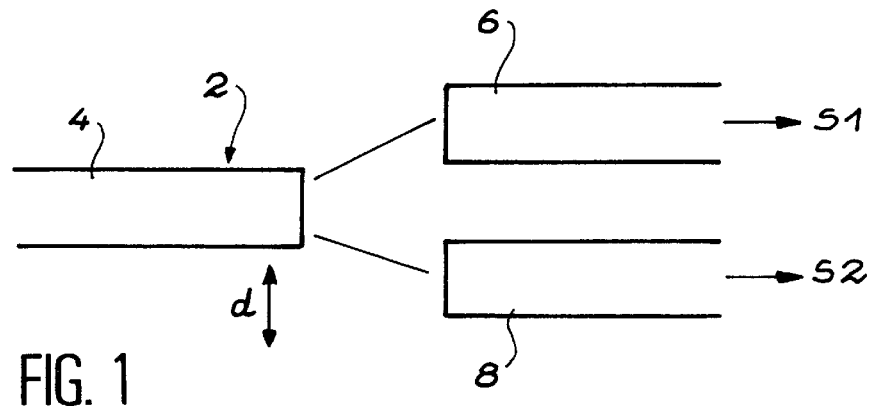
FIG. 1, already described, illustrates an operating diagram of a prior art device.

A first embodiment of the invention will now be described in conjunction with FIG. 2. In this embodiment, the light collection means comprise optical output guides, optical fibres and detectors.

More specifically, the said device comprises a planar layer or guide structure 10 (which can be formed from one or more layers), which is produced on a substrate 12, e.g. of monocrystalline silicon, and which has an input face E and an output face S parallel to one another and e.g. obtained by cleaving. The guide structure 10 e.g. has a 8 to 12 $\mu$m thick silicon oxide buffer layer 14 and a 2 to 10 $\mu$m thick silica upper layer 16, whereby for certain applications the latter can be replaced by air.

The guide structure also incorporates an input microguide 16 and two output microguides 20 and 22 of silicon oxide and doped e.g. by phosphorus, having a height of 2 to 6 $\mu$m and a width of 2 to 8 $\mu$m, as well as a multimode coupler 24 having substantially the same height (2 to 6 $\mu$m), for a typical width of 10 to 50 $\mu$m. The microguides 18, 20, 22 are parallel to a direction x, which is itself parallel to the largest surface 9 of the planar layer or guide structure 10 and are positioned on either side of a recess 26 traversing the guide structure 10.

Hereinbefore has been given an embodiment of a guide structure, but the invention is also applicable to other types of structures such as e.g. those obtained by ion exchange in substrates of glass or lithium niobate or by the deposition or etching of layers of silica, $Si_3N_4$, $SiO_xN_y$, AsGa, InP, etc.

The recess 26 defines, in the guide structure 10 and the substrate 12, a flexible beam 28 oriented in the rest state parallel to the direction x, said beam being displaceable in the recess 26 in a direction y, parallel to the guide structure surface 9 and perpendicular to the direction x. This beam 28 has a fixed end 30, integral with the fixed part, and a free end 32 displaceable in the recess 26. In the extension of the input microguide 18, a central microguide 34 extends over the entire length of the beam 28, its end 36 issuing at the end 32 thereof.

The multimode coupler 24 is positioned facing the end 36 of the microguide 34. The term multimode coupler is understood to mean a multimode guide or coupler having several propagation modes or several monomode guides.

Figure 3:
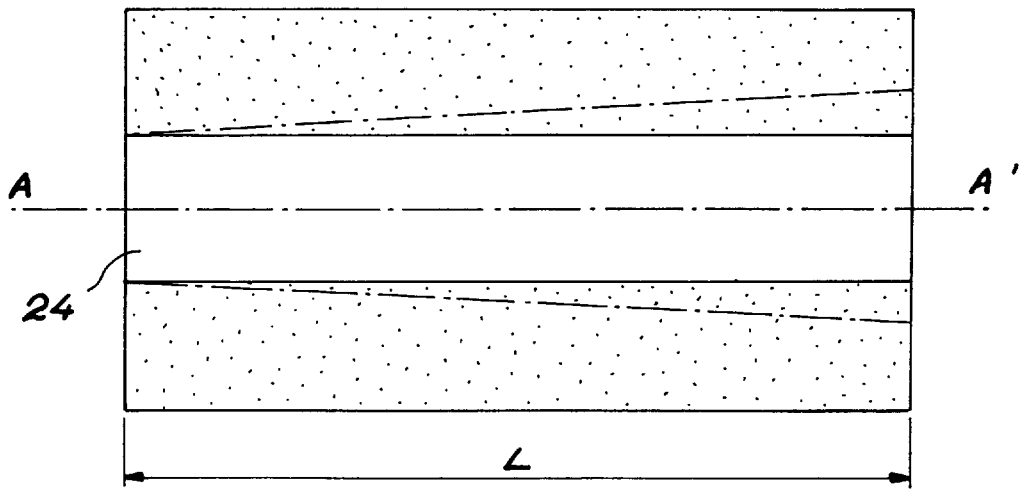
FIGS. 3 and 4 illustrate multimode optical couplers.

The multimode coupler 24 can be straight (FIG. 3), but can also be funnel-shaped, as illustrated in broken line form in FIG. 3. The multimode coupler 24 has an axis of symmetry AA' in FIG. 3, no matter whether the guide is straight or funnel-shaped.

The length L of the multimode coupler 24 is such that an optical signal from the microguide of the mobile part (flexible beam) is transmitted to the N light collection means. Preferably, L is such that when an incident beam I directed onto the input section of the coupler has an intensity distribution with a single maximum, an output beam is obtained having a maximum number N with $N \geq 2$.

The conditions for obtaining such a result are e.g. given by the analytical method described for multimode couplers in an article by R. Ulrich et al entitled "Self imaging in homogeneous planar optical waveguides", published in Applied Physics Letters, vol. 27, No. 6, Sep. 15, 1975, pp 337–339.

Figure 4:
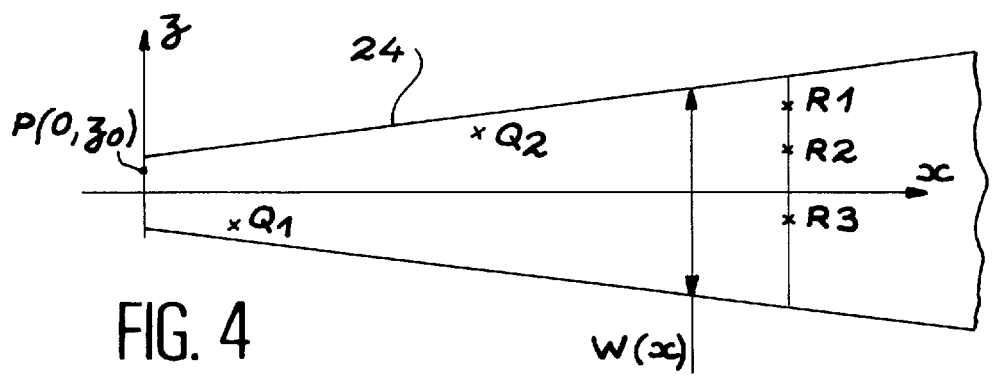

According to this article and as illustrated in FIG. 4, for any multimode coupler 24, in either a parallel or funnel form, and for any object point P within the coupler, there are a certain number of real, single images of P, at different points $Q_1$, $Q_2$, etc. of the coupler, downstream of P in the light propagation direction and, at intermediate positions, multiple images of P (e.g. at $R_1$, $R_2$, $R_3$ in FIG. 4).

The aberration and resolution problems are also studied in the article by R. Ulrich et al. entitled "Resolution of self-images in planar optical waveguides", published in the Journal of the Optical Society of America, vol. 68, No. 5, 1978, pp 583–592.

No matter what the characteristics of the multimode coupler, it is also possible to determine the necessary length for obtaining an intensity distribution with several maxima at the output for a distribution with a single maximum at the input, by applying digital methods such as the beam propagation method (BPM) and variants thereof as described in the article by M. D. Feit et al. "Light propagation in graded-index optical fibers", Applied Optics, 1978, vol. 17, No. 24, pp 3990–3998, the article by G. R. Hadley "Transparent boundary condition for beam propagation", Optics Letters, 1991, vol. 16, No. 9, pp 624–626 and the article by Chung et al. "An assessment of finite difference beam propagation method", IEEE Journal of Quantum Electronics, vol. 26, No. 8, pp 1335–1339, 1990. This digital calculation method, which is based on the resolution of the wave equation is more accurate than the analytical method described hereinbefore. It is even possible to commercially obtain computer software based on this digital method, e.g. the BPM CAD described in National Optics Institute Bulletin, Special Edition, November 1991, Quebec, Canada.

It is alternatively possible to use in place of a wide multimode coupler 24, several preferably parallel monomode guides, which are sufficiently close together to enable their modes to exchange energy. In practice, adjacent monomode guides must be at a distance from one another less than 10 µm and preferably less than 5 µm. The width of a single monomode guide is approximately 1 to 2 µm. The length necessary for obtaining the same result as with a multimode coupler, i.e. an intensity distribution with several maxima at the output for an intensity distribution with a single maximum at the input, is obtained by e.g. applying the same digital methods as mentioned hereinbefore.

Figure 5A:
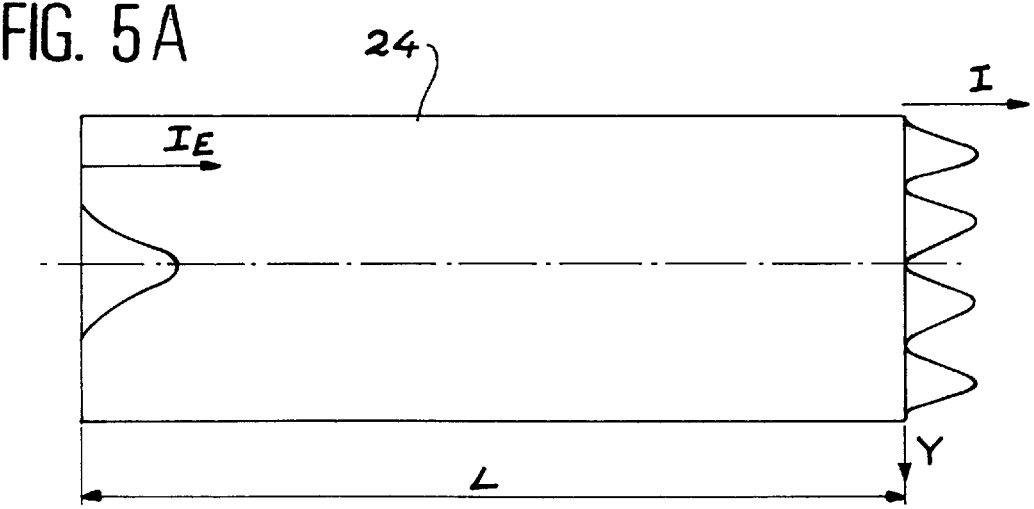
FIGS. 5A, 5B and 5C respectively illustrate the distribution of intensities at the input and output of the multimode guide or coupler, the detailed intensity distribution at the output for a correctly positioned and focussed beam and the detailed distribution at the output for a beam whose position is displaced.
Figure 5B:
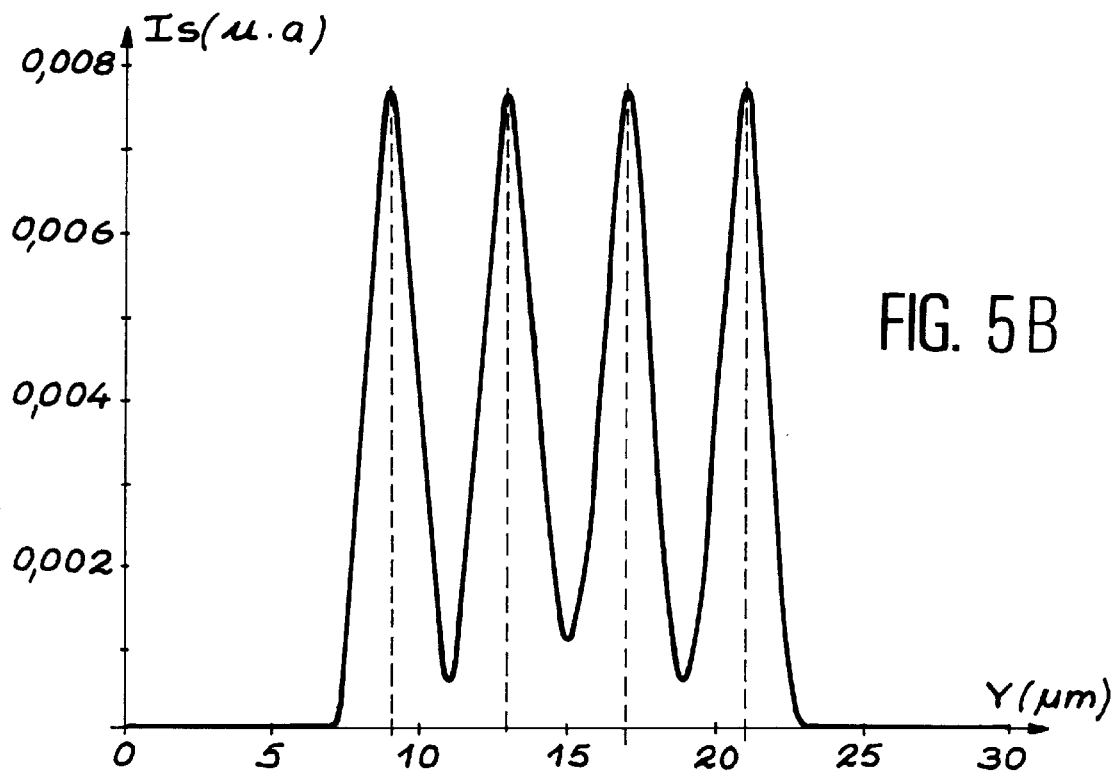
Figure 5C:
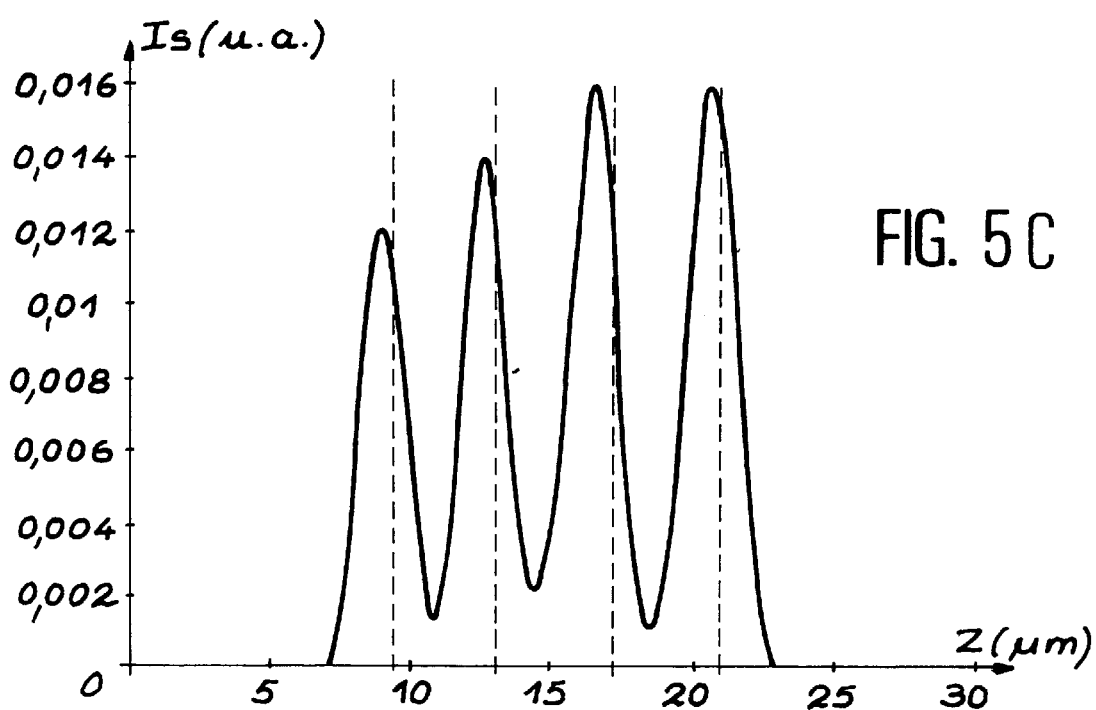

The operation of such a multimode coupler can be explained in conjunction with FIGS. 5A to 5C, which relate to an example of a coupler for which the width W and length L are chosen in such a way that, if the system is not operating, i.e. the input beam $I_E$ has an intensity distribution with a single maximum, centred on the symmetry axis of the coupler, at the output an intensity distribution is obtained with four maxima, at four points $M_1$, $M_2$, $M_3$, $M_4$, distributed symmetrically with respect to the symmetry axis of the coupler (it also being said that four images are obtained at the output).

FIG. 5A diagrammatically shows the intensity distribution at the input and output of the coupler. FIG. 5B shows in greater detail the image distribution at the output. When not in operation, the intensities $I_1$, $I_2$, $I_3$, $I_4$ measured respectively at $M_1$, $M_2$, $M_3$, $M_4$ are equal:

$I_1 = I_2 = I_3 = I_4$.

When the input beam is offcentred, the intensity distribution at the multimode coupler output is unbalanced and on this occasion asymmetrically with respect to the axis AA'. This is illustrated in FIG. 5C showing the evolution of the detailed intensity distribution at the coupler output.

In the case of a coupler, whose characteristics are such that N=2 maxima are obtained at the output for 1 maximum at the input, the operating principle is the same. Thus, there is an unbalance of the intensity distribution of the signal produced at the output when the input beam maximum is displaced.

The operation of a device or sensor according to the invention is as follows. An optical signal is produced by a radiation source (e.g. at the wavelength 0.78 µm), not shown in FIG. 2 and is then transmitted by an input optical fibre 17 and the microguide 18 and then 34 in the direction of the multimode coupler 24. At the output of the latter, N output guides 20, 22 (N=2 in FIG. 2) transmit the radiation from the coupler 24 to N optical fibres 38, 40, which are themselves connected to N photodetectors 42, 44. Each output microguide is positioned at the formation point of a maximum, at the coupler output, when the input beam is centred on the coupler input. Each detector delivers a signal representative of the optical signal transmitted by the optical fibre at the output of which it is located. Finally, these detectors are connected to means 46 for the processing of the signals which they supply.

The processing of the signals by the means 46 can take place in several different ways. For example, it is possible to digitize each signal supplied by a photodetector with the aid of an analog-digital converter and then carry out digital processing with the aid of a microprocessor. It is also possible for the signals supplied by the photodetectors to undergo an analog processing with the aid of circuits of the amplifier or operational amplifier type.

The device 46 also integrates means for performing different operations on measured quantities, particularly operations of combining these quantities with one another (a combination $$S = \sum_{i=1}^{N} \lambda_i S_i$$

is e.g. then formed, where $\lambda_i$ is a weighting factor of the signal $S_i$ coming from the detector i). It can also clearly integrate any means necessary for the storage of data.

For example, when a vibration or acceleration occurs, the free end of the beam 8 moves in the direction y, which modifies the distribution of the radiation at the output of the multimode coupler and therefore the radiation transmitted by the N output guides 20, 22 and consequently the signal produced by the detectors 42, 44. Thus, as stated hereinbefore, the displacement $d_y$ is linked with the acceleration γ of the vibration by the relation:

$$d_y = \frac{\gamma}{(2 f_0)^2} \quad (1)$$

in which $f_o$ is the natural resonant frequency of the beam 28.

In general terms, the design of a device or sensor according to the invention is guided by a specification preferably specifying the desired acceleration measurement range from a certain minimum acceleration $\gamma_{min}$ to a certain maximum acceleration $\gamma_{max}$ and the desired measurement frequency range from a certain frequency $f_{min}$ to a certain measurement frequency $f_{max}$.

Figure 6:
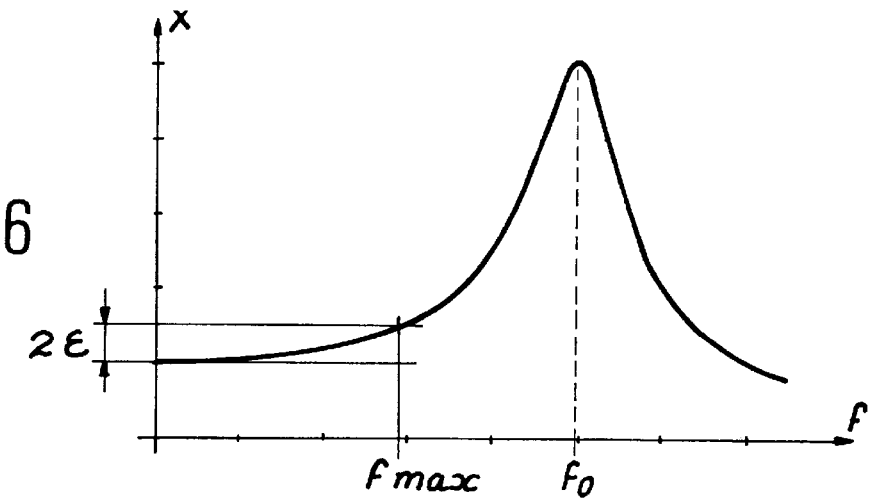
FIG. 6 graphically illustrates the displacement of a seismic mass subject to an acceleration, as a function of its frequency.

Moreover, the sensor preferably has a flat frequency response, i.e. the signal-to-acceleration ratio must be constant with the frequency of the acceleration with a specific precision ε (typically ε=1%, 2% or 5%). The displacement $d_y$ of a seismic mass as a function of the frequency in general terms has the form shown in FIG. 6. The maximum linear measurement frequency $f_{max}$ is then given by the relation:

$$f_{max} = \sqrt{\frac{2\varepsilon}{1+2\varepsilon}} f_0 \qquad (2)$$

in which $f_o$ is the resonant frequency of the seismic mass and $f_{max}$ and $\varepsilon$ are given by the specification, so that this relation makes it possible to fix the resonant frequency $f_o$. Once $f_o$ has been obtained, the seismic mass displacement $d_y$ as a function of the acceleration $\gamma$ is given by the above relation (1).

Thus, the dimensioning of the seismic mass amounts to fixing the geometrical dimensions of the structure in order to obtain a certain displacement $d_y$, when it is subject to an acceleration $\gamma$.

Figure 7A:
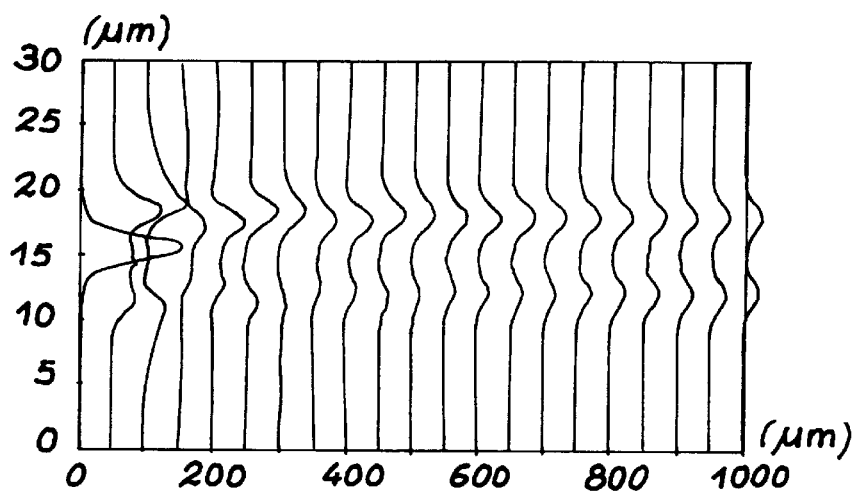
FIGS. 7A and 7B are comparative graphs for a device without a multimode guide and a device with a multimode guide.
Figure 7B:
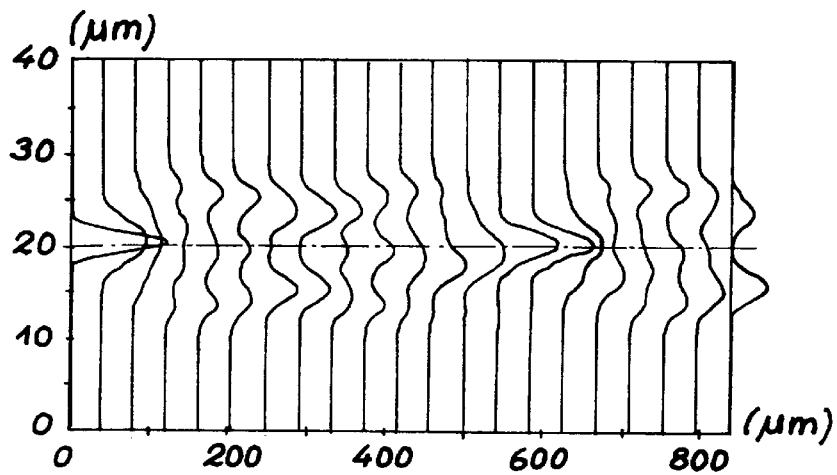

FIGS. 7A and 7B represent comparative simulations. In FIG. 7A this is for a sensor without a multimode coupler. The microguide of the beam faces two output microguides. The microbeam is brought into the displaced position with respect to its rest position, so that the transmitted incident beam between the inputs of the two guides is displaced by 0.5 μm with respect to the centre of said two guides. In FIG. 7B for a sensor with a multimode coupler. The microbeam is displaced by the same quantity as for FIG. 7A (0.5 μm with respect to the axis of the coupler indicated by a broken line).

In the first case according to FIG. 7A, there are considerable light losses and the signals transmitted at the output of the two guides only differ very slightly. In the second case, the result is clearly better, because there is much more energy in the output guides. Moreover, the light intensity in the bottom output guide is much greater than in the top output guide. Thus, the signal is greater than in the preceding case.

This comparative example shows that the introduction of a multimode coupler reveals displacements of the microbeam to which a conventional device is not sensitive. Moreover, the use of a multimode guide avoids a loss of part of the light energy from the mobile guide, so that the signal-to-noise ratio is improved.

Figure 8:
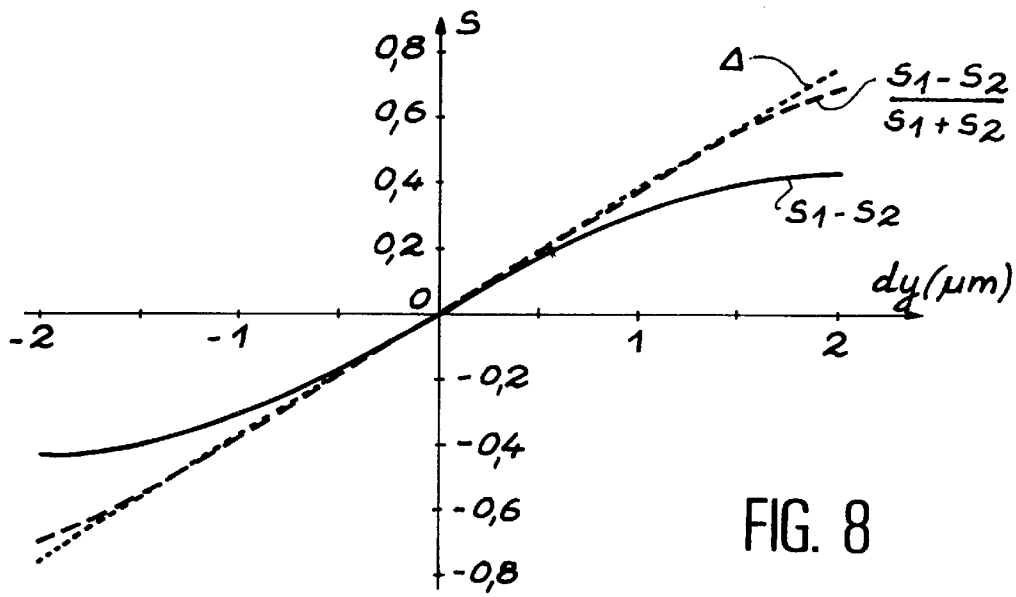
FIG. 8 illustrates output signals of a device according to the invention.

FIG. 8 shows the signal S from a sensor or device according to the invention, as a function of the mobile guide displacement $d_y$. Two output detectors (N=2) respectively supply a signal $S_1$, $S_2$. FIG. 8 shows that the difference of the signals $S=S_1-S_2$ makes it possible to obtain a quasi-linear signal for relatively small displacements (the perfectly linear response is a straight line $\Delta$ represented in broken line form). On carrying out the processing $(S_1-S_2)/S_1+S_2)$, a quasi-linear signal is obtained over a larger displacement range of the mobile guide.

Figure 2:
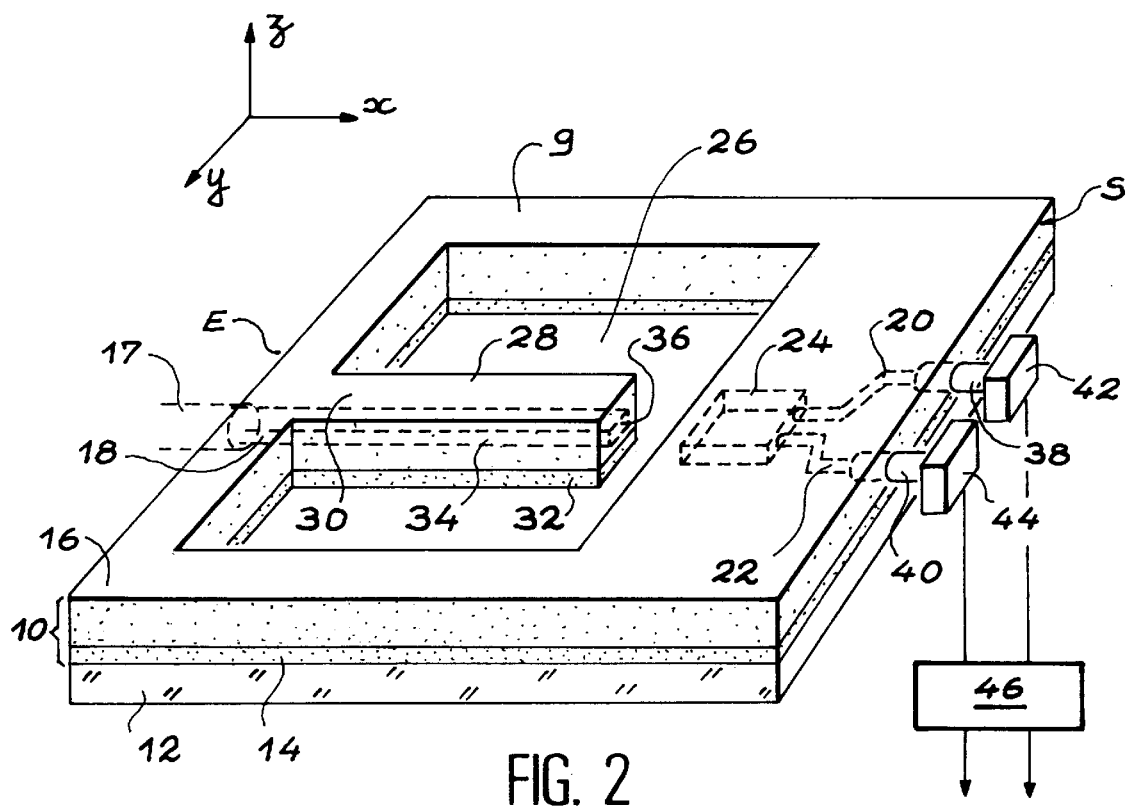
FIG. 2 illustrates an embodiment of a device according to the invention.
Figure 9A:
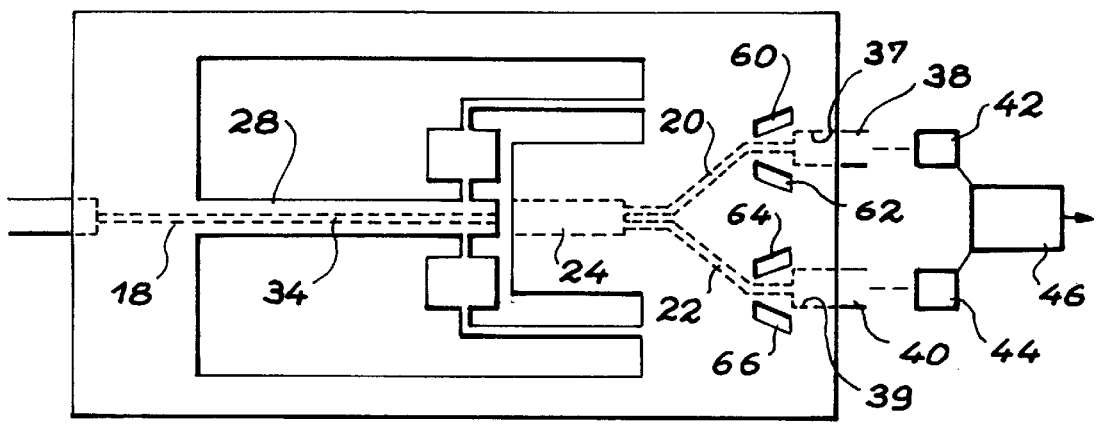
FIGS. 9A and 9B illustrate an embodiment of the invention with optical reflectors at the optical guide output.

As illustrated in FIG. 9A, which shows a device according to the invention in plan view, the references being the same as in FIG. 2, it is possible to add reflectors 60, 62, 64, 66 on either side of each output guide 20, 22 and in front of the connection of said guides to the output optical fibres 38, 40.

Figure 9B:
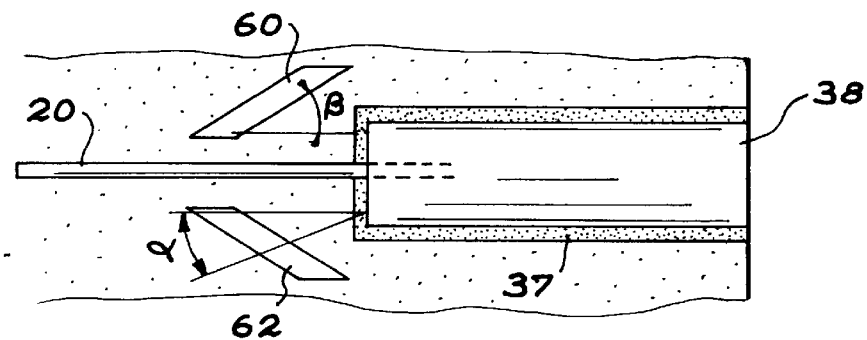

The function of these reflectors can be more precisely explained with the aid of FIG. 9B, which shows the end of the output guide 20, the connection to the optical fibre 38 and two reflectors 60, 62. In the example illustrated in FIG. 9B, the latter are rectangles hollowed out from the device during the production stage used for the mechanical structure (structures 14, 16 and guides 20, 22) and fibre reception holes.

The reflectors must have a refractive index $n_2$ lower than the refractive index $n_1$ of the surrounding medium. Thus, the hollowed out holes must have a material of index $n_2$, which can be a metal layer or a gaseous medium such as air ($n_{air}=1$) or even vacuum ($n_{vacuum}=1$).

Moreover, an optical fibre is characterized by its acceptance cone of angle $\alpha$. If the angle of a beam is less than the angle of said acceptance cone $\alpha$, then the beam again enters the output optical fibre and is guided. If its angle exceeds $\alpha$, then it is not guided by the output optical fibre.

In addition, when a beam propagating in a medium of index $n_1$ encounters an interface with a medium of refractive index $n_2$ lower than $n_1$, it is totally reflected when the angle formed by said beam with the perpendicular to the plane of the interface exceeds $\text{Arcsin}(n_2/n_1)$.

Thus, the reflectors make it possible to reflect the stray beams or light, whose angles are in the acceptance cone of the optical fibre when the angle $\beta$ formed by its main side with the axis of the guide 20 and the fibre 38 is such that:

$$\beta < \frac{\pi}{2} - \alpha - \text{Arcsin}\left(\frac{n_2}{n_1}\right)$$

in which $n_2$ is the index of the reflector and $n_1$ the index of the guiding structure or layer. The more $n_2$ is below $n_1$ the more the reflector will reflect a large angular range. It is therefore of interest to have $n_2$ as low as possible (therefore air or vacuum).

The beams or rays outside the thus defined cone are stray rays or beams, which will not be introduced into the fibre. Thus, only the rays from the microguide are transmitted to the fibre.

An example of a process for producing a device according to the invention could comprise the following stages:

- a stage of forming the layer 14, e.g. by thermal oxidation of the substrate 12,
- the deposition of a silica layer by LPCVD or PECVD, which is e.g. doped with phosphorus,
- a stage of producing, e.g. by photolithography, a positive resin mask masking the zones intended to constitute the microguides 34, 20, 22 and the multimode coupler 24 (or coupled monomode guides),
- an anisotropic etching stage of the reactive ionic type performed through said mask, to obtain the microguides and multimode coupler, the mask then being eliminated with an oxygen plasma,
- a stage of depositing the layer 16 by LPCVD or PECVD,
- a stage of producing another mask (as above) in order to free the beam 28,
- an anisotropic etching stage of the reactive ionic type using e.g. $CHF_3$, said stage making it possible to etch the layers 14 and 16, both for defining the beam and the connection zones,
- an isotropic etching stage (reactive ionic etching with e.g. $SF_6$) of the silicon substrate 12 using the same mask, in order to free the beam from the substrate, but also terminate the production of the connection zones 37, 39 (FIGS. 9A and 9B) of the optical fibres 38, 40.

If reflectors are provided (e.g. on FIG. 9B), the corresponding locations are hollowed out at the same time as the fibre connection zones.

Figure 9C:
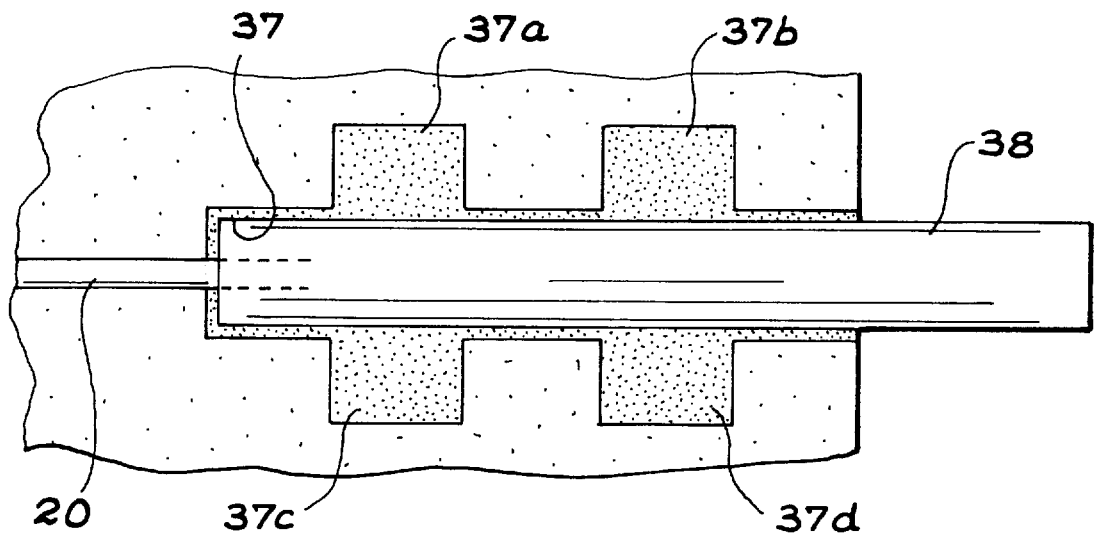
FIG. 9C illustrates a connection zone of an optical fibre and widenings of said zone.

As illustrated in FIG. 9C (which only shows a single output guide and the corresponding optical fibre), the connection zone 37 provided for a fibre 38 can also be widened at certain locations 37a, 37b, 37c, 37d to facilitate the supply of optical adhesive making it possible to hold the fibres. The widenings 37a–37d are produced at the same time as the connection zone 37. This can apply to each connection zone of a fibre.

No matter what the envisaged production procedure, the shape of the beams can also be modified so as to increase the sensitivity and/or obtain freedom from parasitic deformation and sensitivity problems along the axis z (vertical or perpendicular to the plane 9 of the device).

Figure 10:
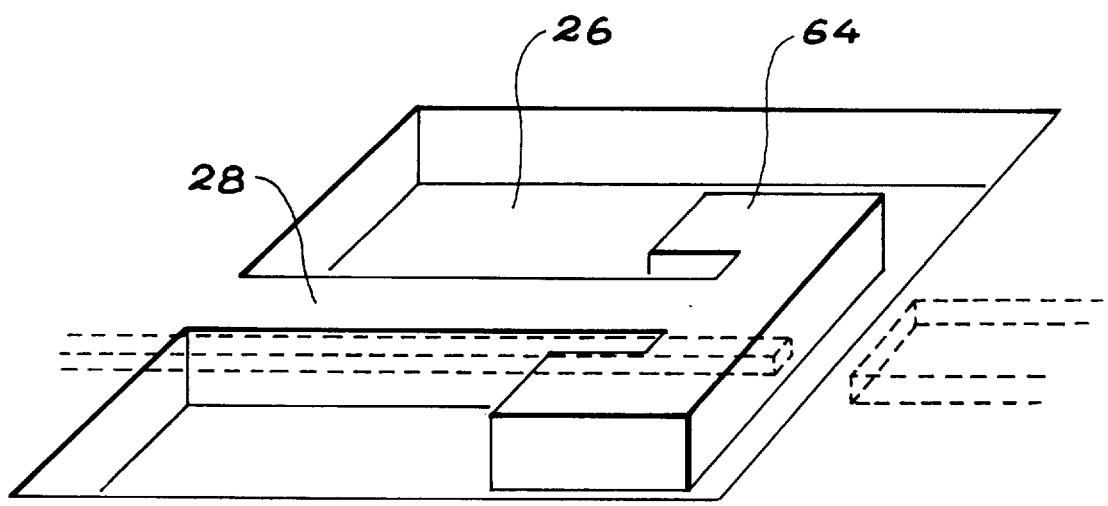
FIG. 10 illustrates a weighted beam.

More specifically and as illustrated in FIG. 10 (which only shows the beam 28 in the recess 26), the beam can be weighted. One way of weighting or ballasting the beam consists of having a more voluminous, free end 64. This leads to a beam with a greater mass and therefore, for the same acceleration, greater displacements of the free end, so that it is easier to detect very small accelerations.

Figure 11A:
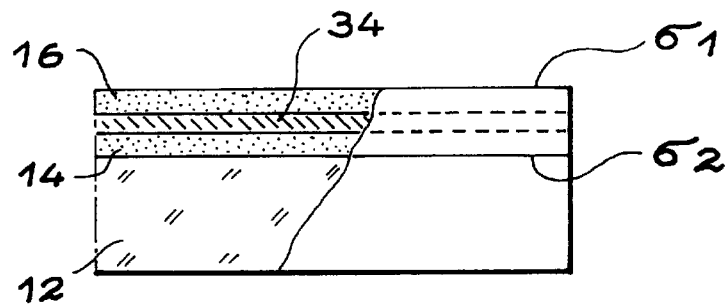
FIGS. 11A and 11B illustrate stages in the production of a device according to the invention before and after etching the substrate.
Figure 11B:
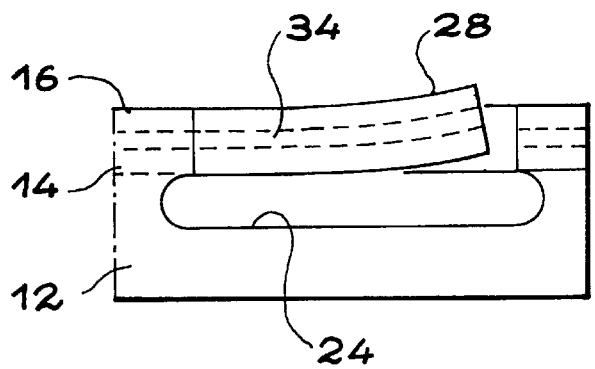

Another problem is linked with the sensitivity of the beam along the axis z, i.e. in a direction perpendicular to the plane of the device. The beam production stage can lead to a stress gradient in accordance with the vertical direction z, which gives rise to a deformation of the system. This is in particular the case when the beam is of silica, obtained by PECVD, with different phosphorus doping operations. This is illustrated in FIG. 11A, where numerical references identical to FIG. 2 designate the same elements. FIG. 11A shows the structure obtained before the beam freeing stage and $\sigma_2$ designates the stress at the interface between the substrate 12 and thin layer 14, 34 16 and $\sigma_1$ designates the stress at the surface of the thin layer. Due to differences in the nature of the underlayers 14, 34 and 16, as well as phosphorus doping differences in the layer, there is a stress gradient in the thin layer: the stress $\sigma_2$ being lower than the stress $\sigma_1$. Thus, on freeing the beam 28, i.e. when the cavity 26 is hollowed beneath the beam 28, this leads to a vertical deviation of said beam, which completely offcentres the input and output optical guides, which can render the device inoperative, as illustrated in FIG. 11B.

Figure 12A:
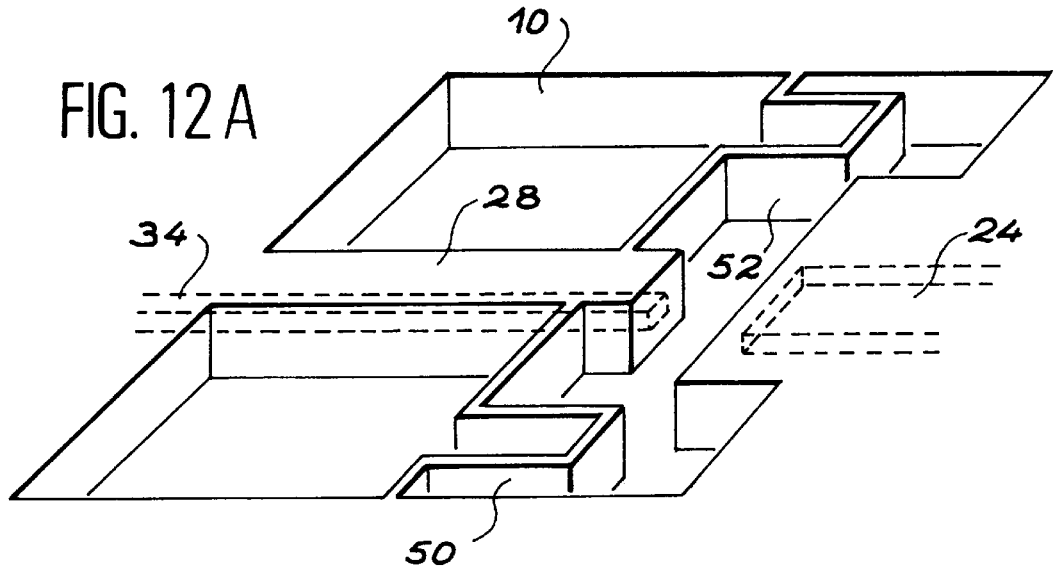
FIGS. 12A to 12C illustrate various means for compensating deformations of the mobile part.

A first solution to these problems falling within the scope of the invention is illustrated in FIG. 12A. Identical references to those of FIG. 2 represent the same elements, but everything is shown more diagrammatically.

Figure 12B:
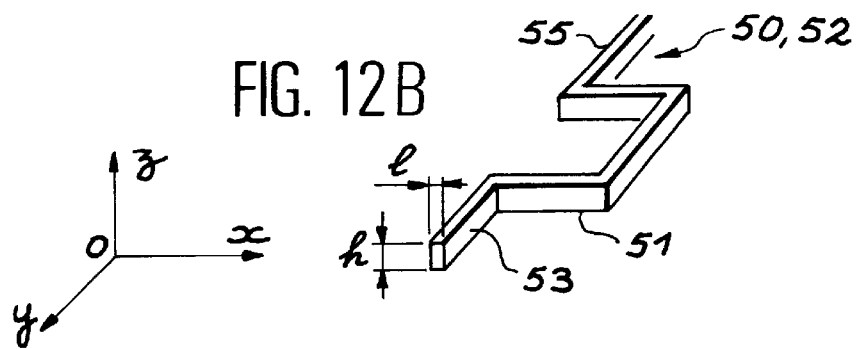

The compensation system is constituted by two arms 50, 52 connecting the free end of the beam 28 to the remainder of the structure 10, which is a fixed part, because it is connected to the silicon substrate 12. As can be seen in greater detail in FIG. 12B, each arm 50, 52 can be constituted by a U-shaped body 51, a branch 53, 55 being added to the free end substantially perpendicular to each lateral branch of the U. The free end of one of these branches 53, 55 is connected to the beam 28, the free end of the other branch being connected to the remainder of the guide structure 10. The same applies with respect to the second compensating arm.

The geometry of the compensating arms can be envisaged in various ways. Nevertheless, the arms are chosen rigid in the vertical direction (direction z) and flexible in the horizontal direction (plane xy). Action can take place on the geometry of the arms by increasing the height/width form factor, the height h and width l being identified in FIG. 12B as respectively the height of the section of the compensating arm in a vertical section (in accordance with a plane parallel to zx) and the width of the compensating arm in the same vertical section. By acting on this form factor, it is possible to obtain an adequate flexibility in the plane xy not to impede the displacements of the beam in said same plane and an adequate rigidity in direction z to limit the deformations of the beam in said same direction.

According to another embodiment, the arms are straight or of straight form.

Figure 12C:
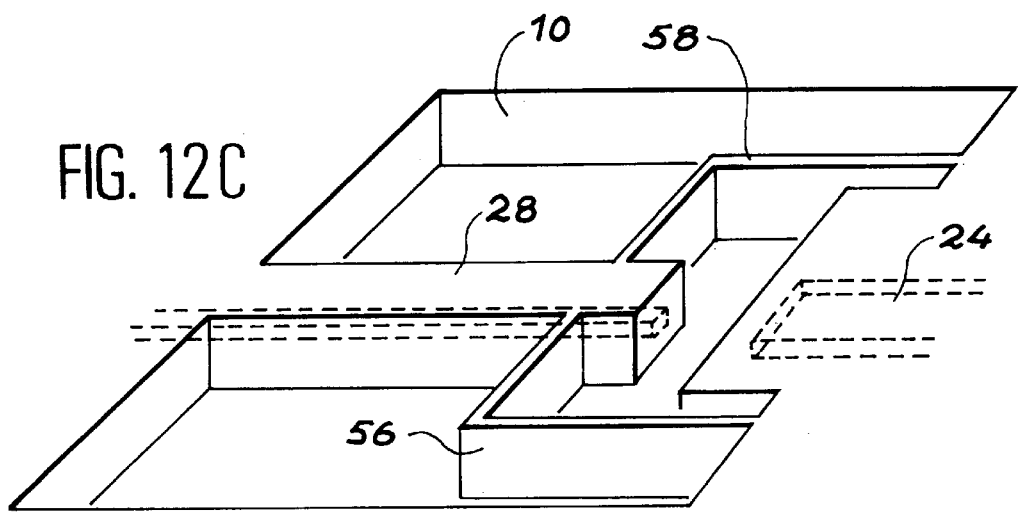

Another embodiment of the compensating arms is illustrated in FIG. 12C, where there are once again two compensating arms 56, 58, but each arm is approximately at right angles with two segments substantially perpendicular to one another. Once again an action takes place on the height/width form factor or ratio of the section of each arm, so as to give it the desired rigidity in the vertical direction and the desired flexibility in the horizontal plane.

The system can also function with a single compensating arm. Nevertheless, a preferred embodiment is that where the system is symmetrical in the horizontal plane (as in FIGS. 12A and 12C, with respect to a median plane parallel to z0x). In more general terms, if the mobile part, whose deformations are to be corrected, has a certain spatial symmetry, it is desirable for the compensation system to have the same symmetry. This geometry avoids small lateral deformations which could arise due to buckling of the arms, due to the fact that the silica or the material constituting the mobile part is globally in compression.

These different compensating arm structures make it possible to reduce on the one hand the sensitivity of the device according to the z axis and on the other the deviations according to said same z axis, due to stress gradients.

Figure 13:
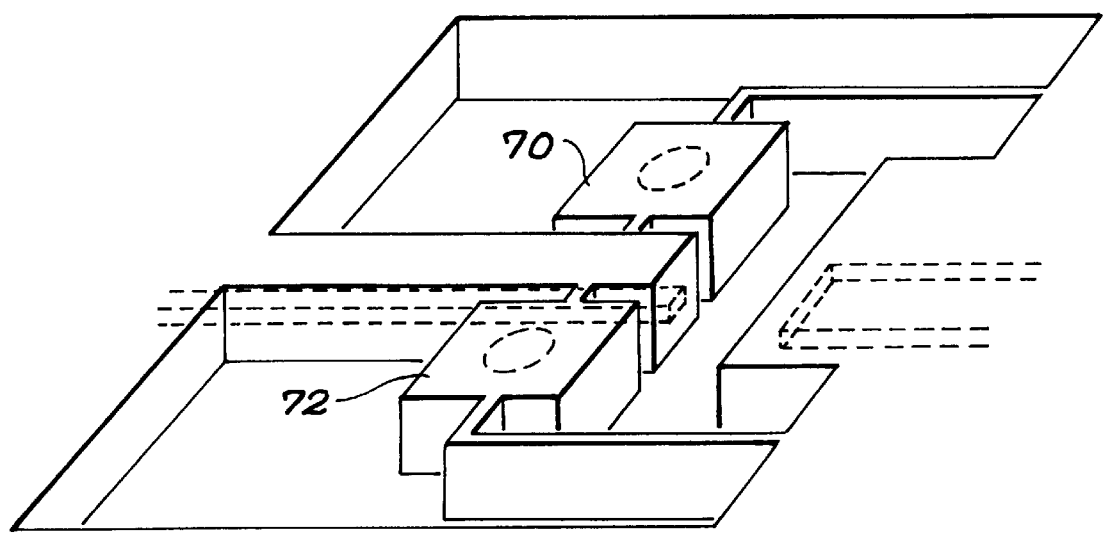
FIG. 13 illustrates a weighted beam with a compensating device.

Finally, as illustrated in FIG. 13, it is possible to combine the two aforementioned embodiments using both a weighted beam and compensating arms. The device then benefits from the advantages of both embodiments.

No matter what shape is adopted for the compensating arms, the latter are e.g. produced at the same time as the main beam by etching. Only the geometry of the etching mask changes.

In the case where the device incorporates on either side of the beam weighting elements (like the elements 70, 72 in FIG. 13), the release of the central beam and said elements 70, 72 takes place simultaneously with the production of the connection holes for the optical fibres. The etching depth and therefore etching time are determined by the fibre diameter. This time is generally less than the time necessary for freeing the mechanical structure, if the latter also incorporates weighting elements. To obviate these disadvantages, it is possible to produce these holes beforehand in the weighting elements (such holes being shown in broken line form in FIG. 13). These holes are produced at the time of etching the layer 10 in order to define the weighting elements. These holes facilitate the freeing of the mechanical structure and can have any random shape. Their size is adapted to the production method or chosen etching.

Figure 14:
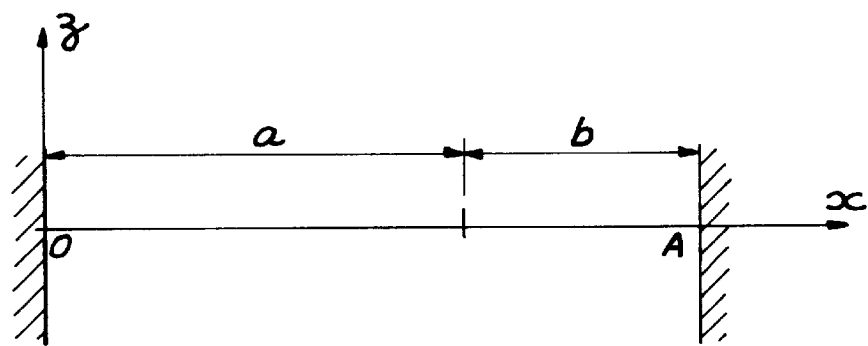

A process for dimensioning compensating arms will now be described. This process consists of modelling the real beam+compensating arm system in the following way (cf. FIG. 14). The microbeam is likened to a first single beam of length a (length of the real microbeam) of rigidity $E_1 \times I_1$ ($E_1$ representing the Young's modulus of the microbeam and $I_1$ its moment of inertia), it being embedded in a fixed support at a point 0, which is also taken as the origin of a coordinate 0xz. The compensating arms are likened to a second beam of length b (length of a compensating arm), whereof one end is embedded in a fixed support at a point A, whilst the other free end is connected to the free end of the beam of length a, rigidity $E_2 \times I_2$ ($E_2$ representing the Young's modulus of the compensating arms, $I_2$ double the moment of inertia of a single arm, the second beam having a weight twice that of a single compensating arm).

The above modelling is valid for beams of different geometries, the geometry differences being reflected in the calculation of the moments of inertia $I_1$ and $I_2$.

It is also assumed hereinafter that the beams are integral, i.e. the part of the compensating arms perpendicular to the axis of the beam is not deformed. This is justified to the extent that the perpendicular length of the arms is typically five times smaller than the length of the parallel arms and the deformation is generally proportional to the cube of said length. Thus, there is a factor of at least 100 between the deformation of the parallel arms and that of the perpendicular arms and the smallest is consequently ignored.

Figure 15:
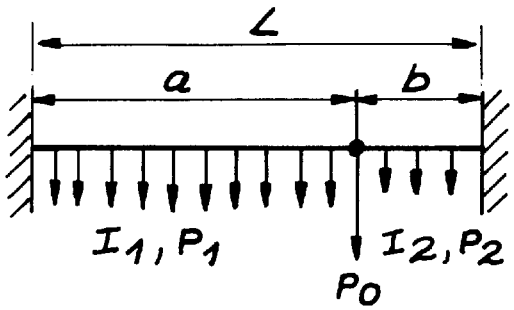
Figure 15:
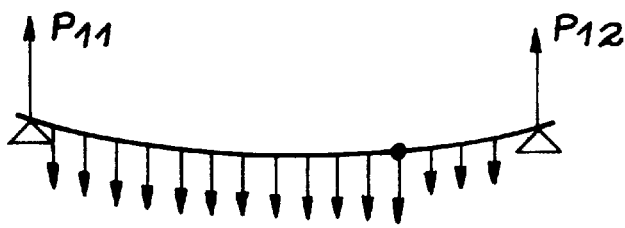
Figure 15:
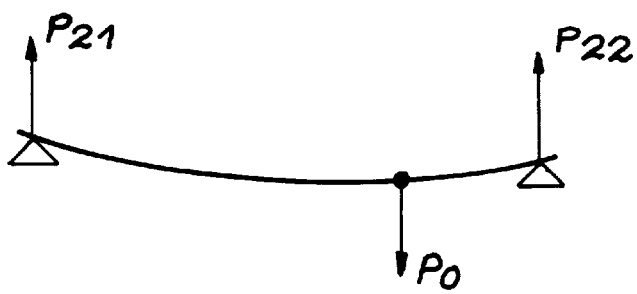
Figure 15:
Figure 15:

In order to be complete, the model retained is that of FIG. 15A where, to the beam of total length a+b described hereinbefore, is allocated a field of distributed forces $P_0$, $P_1$, $P_2$. $P_0$ represents the weight of the weighting structure, $P_1$ represents the distributed weight of the main beam, $P_2$ represents the distributed weight of the compensating beams ($P_1 = \rho S_1 g$, in which $\rho$ designates the density of the material, $S_1$ the section of the beam and g the acceleration; $P_2 = \rho 2 S_2 g$ in which $S_2$ is the section of a compensating arm).

This model is then broken down in the manner illustrated in FIGS. 15B to 15E. With each of these FIGS. corresponds a stress field and a deformation $y_1(x)$, $y_2(x)$ ($y_1$ for $0 \leq x \leq a$ and $y_2$ for $a \leq x \leq a+b$):

- in the case of FIG. 15B, the equivalent beam is subject to a force distributed along it and is free from any torque at the ends, $P_{11}$ and $P_{12}$ designating the reaction forces at the two ends,
- in the case of FIG. 15C, the equivalent beam is subject to a point force at the centre of gravity of the weighting load and it is free from any torque at the two ends, $P_{21}$ and $P_{22}$ designating the reaction forces at the two ends,
- in the case of FIG. 15D, the equivalent beam is subject to a torque $M_a$ at one end and is free from any torque at the other end,
- in the case of FIG. 15E, the deformation of the equivalent beam is subject to a torque $M_b$ at the other end and is free from any torque at the first end.

The total deformation of the beam is the sum of the four deformations calculated separately. Finally, the torques imposed at the ends are determined by imposing zero deformation angles to the two ends of the total deformation.

The calculations only use polynomial deformations. The application of conditions at the limits rapidly leads to relatively heavy expressions of the integration constants of these polynomials. For this reason, all that is shown here is the method and main results, without going into calculation details. The latter can take place with the aid of a symbolic calculation software (e.g. Mathematica of Wolfram Research).

1. Calculation of the deformation for the case of FIG. 15B

Firstly the reaction forces $P_{11}$ and $P_{12}$ are calculated. For this purpose, the equilibrium of the forces and the equilibrium of the moments at the junction point between the two beams are written:

$$\begin{cases} P_{11} + P_{12} = p_1 a + p_2 b \\ \sum M_A = 0 \Rightarrow P_{11} a - \frac{1}{2} p_1 a^2 + \frac{1}{2} p_2 b^2 - P_{12} b = 0 \end{cases}$$

$P_{11}$ and $P_{12}$ are obtained from these two equations. The second stage consists of expressing, at any point x, the moment $M_x$ due to the forces present upstream of said point:

if $0 < x < a$, then $$M_x = P_{11} x - \frac{1}{2} p_1 x^2$$

if $a < x < a+b$, then $$M_x = P_{11} x - \frac{1}{2} p_1 x^2 - \frac{1}{2}(p_2 - p_1)(x - a)^2$$

We then obtain the equation of the deformation:
for $0 < x < a$:

$$E I_1 \frac{d^2 y}{dx^2} = \frac{1}{2} p_1 x^2 - P_{11} x$$

for $a < x < a+b$:

$$E I_2 \frac{d^2 y}{dx^2} = \frac{1}{2} p_1 x^2 + \frac{1}{2}(p_2 - p_1)(x - a)^2 - P_{11} x$$

The third stage is integration, giving:
for $0 < x < a$:

$$E I_1 y_1(x) = A_0 + A_1 x - \frac{1}{6} P_{11} x^3 + \frac{1}{24} p_1 x^4$$

for $a < x < a+b$:

$$E I_2 y_2(x) = B_0 + B_1 x - \frac{1}{6} P_{11} x^3 + \frac{1}{24} p_1 x^4 + \frac{1}{24}(p_2 - p_1)(x - a)^4$$

The fourth stage consists of finding the constants $A_0$, $A_1$, $B_0$, $B_1$, for which purpose the conditions are at the following limits:

$$y_1(0) = 0$$
$$y_2(a + b) = 0$$
$$y_1(a) = y_2(a)$$
$$\frac{dy_1}{dx}(a) = \frac{dy_2}{dx}(a)$$

Thus: $A_0 = 0$ $$B_0 = \left(\frac{I_2}{I_1} - 1\right)\left(\frac{I}{3} P_{11} a^3 - \frac{1}{8} p_1 a^4\right),$$

$$B_1 = \frac{1}{a+b}\left[-B_0 + P_{11} \frac{(a+b)^3}{6} - p_1 \frac{(a+b)^4}{24} - (p_2 - p_1)\frac{b^4}{24}\right]$$

$$A_1 = \frac{I_1}{I_2} B_1 + \left(\frac{I_1}{I_2} - 1\right)\left(\frac{1}{6} p_1 a^3 - \frac{1}{2} P_{11} a^2\right),$$

with: $P_{11} = \frac{1}{a+b}\left[p_1 a\left(\frac{a}{2} + b\right) + p_2 \frac{b^2}{2}\right]$ 2. Calculation of the deformation in the case of FIG. 15C The method is strictly identical and the calculations are even simpler.

The equilibrium of the forces and moments rapidly leads to:

$$P_{21} = \frac{b}{a+b} P_0, \quad P_{22} = \frac{a}{a+b} P_0$$

The moment $M_x$ is:
for $0<x<a$:

$$M_x = \frac{bP_{21}}{a+b}x$$

for $a<x<a+b$:

$$M_x = \frac{bP_{22}}{a+b}x - P(x-a)$$

and the deformations are written:
for $0<x<a$:

$$EI_1 y_1(x) = A_0 + A_1 x - \frac{bP_{21}}{a+b}\frac{x^3}{6}$$

for $a<x<a+b$:

$$EI_2 y_2(x) = B_0 + B_1 x - P_{22}a\frac{x^2}{2} + \frac{aP_{22}}{a+b}\frac{x^3}{6}$$

with: $A_0 = 0$, $$B_0 = \left(\frac{I_2}{I_1} - 1\right)\frac{bP_{21}a^3}{3(a+b)}$$

$$B_1 = \frac{1}{a+b}\left[-B_0 + \frac{bP_{21}}{6}(a^2 + 2ab)\right], \text{ and}$$

$$A_1 = \frac{I_1}{I_2}B_1 + \left(1 - \frac{I_1}{I_2}\right)\frac{bP_{22}a^2}{2(a+b)}$$

3. Calculation of the deformations in the cases of FIGS. 15D and 15E

FIG. 15D, the moment at any point is written:

$$M_x = M_a \frac{L-x}{L}$$

and the remainder of the calculations is equivalent to those given hereinbefore.

FIG. 15E, same calculation as for FIG. D, with $$M_{ox} = M_b \frac{x}{L}.$$

Once each deformation has been separately calculated for each of the four above cases, each deformation is designated by $y_{i1}$, $Y_{i2}$, $i=1-4$, the total deformation is obtained by:

$$y_{totj}(x) = \sum_{i=1}^{4} y_{ij}(x), \quad j = 1.2$$

The moments $M_a$ and $M_b$ are obtained by imposing:

$$\frac{dy_{tot1}}{dx}(0) = \frac{dy_{tot2}}{dx}(a+b) = 0.$$

Figure 16:
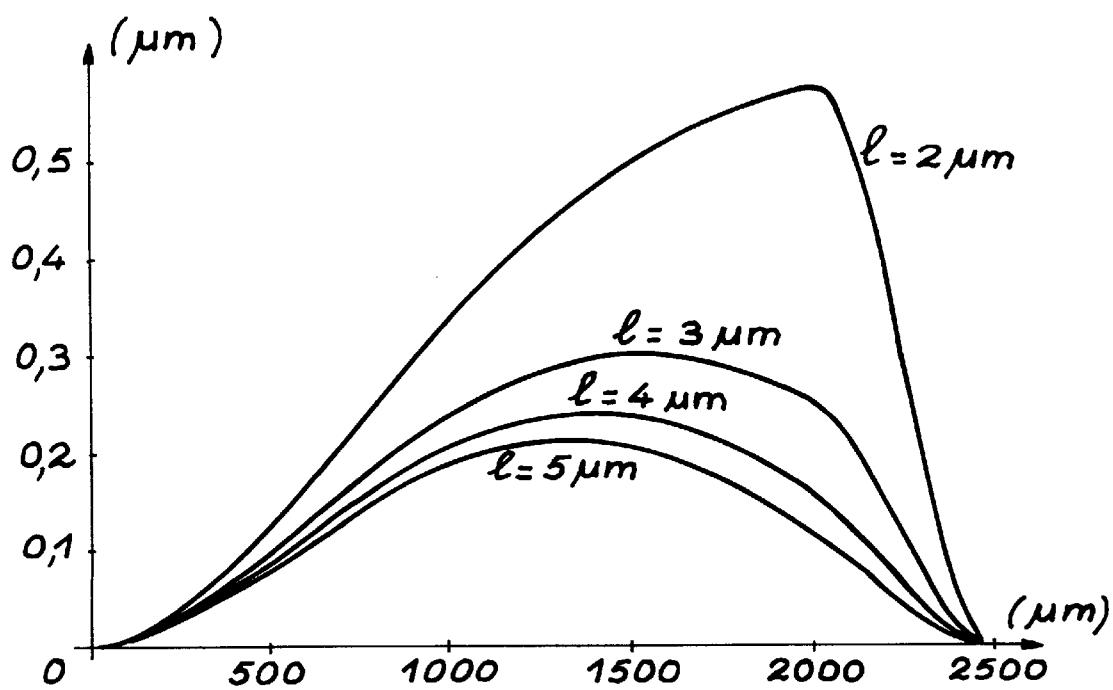
FIG. 16 illustrates the deformation of a beam, for various compensating arm width values.

FIG. 16 gives an example of the deformation obtained by a compensated, but not weighted silica beam under the effect of an acceleration of 400 m/s². The beam is 2 mm long, 10 µm wide and the compensating arms are 500 µm long. The different curves are obtained for widths 1 of different compensating beams. As a function of the accepted maximum amplitude of the deformation, arms having the necessary widths are retained. It is also possible to calculate the deformation as a function of another parameter (e.g. the length b of the compensating arms) in order to deduce therefrom the value of said parameter, to be chosen for a certain maximum amplitude of the deformation.

According to an example (using the process whose stages were described hereinbefore), a sensor was produced with the following characteristics:

optical structure thickness (structure 10 of FIG. 2: 15 µm (layer 14: approximate thickness 8.5 µm, layer 16: thickness approximately 6.5 µm), index $n_3$ of the layers 14 and 16: $n_3$=1.47, index $n_4$ of the microguide 34 (and guides 18, 20, 22, as well as the coupler 24): $n_4$=1.48, dimension of the microguides 34, 18, 20, 22 in a plane perpendicular to its axis: width=2.5 µm, thickness=2 µm, dimension of the multimode coupler: 840 µm×15 µm (its behaviour is given by FIGS. 7B and 8), geometrical characteristics of the beam: length=2 mm, width=10 µm, compensating arm: length=500 µm width=2 µm.

The beam end is displaced by 0.6 µm for an acceleration of 400 m/s² (FIG. 16). Thus its resonant frequency is 4100 Hz. The frequency linearity is ±5% on a frequency band from 0 to 1200 Hz. Assuming a signal-to-noise ratio of approximately 30 dB, a sensor with the following specifications is obtained:

linear measurement range: 0 to 1200 Hz, resonance 4100 Hz and $\epsilon$=5%, acceleration range: 0 to 1000 m/s² (linear response for beam end displacements between −1.5 and +1.5 µm), measurement sensitivity: 1 m/s² (30 dB).

The devices according to the invention can be used in the optomechanical sensor field. Thus, it is possible to produce accelerometers or vibration detectors, the deviation of the mobile beam or part making it possible to detect an acceleration or vibration. The invention can also be applied to microphony or to the measurement of pressures, which involve the detection of vibrations or a deformation applied to a mobile part.

We claim:

1. An optomechanical device comprising:

a first part, and a second part having an optical guiding structure with two ends, a first end fixed to the first part and a second end being mobile in a first direction (y), the fixed part having N, N being integer $\geq 2$, light collection means and a multimode coupler, said coupler having an input facing the second end of the optical guiding structure and an output making it possible to transmit an optical signal from the second end to the N light collection means.

2. An optomechanical device according to claim 1, the multimode coupler being able, when a distribution of the optical signal directed at the input of the coupler has a maximum, to transform this distribution into a distribution having N (N$\geq$2) maxima at the output of the coupler.

3. An optomechanical device according to claim 1, the multimode coupler having an array of monomode guides distributed so as to be able to exchange energy and able, when the distribution of the optical signal directed at the input of the array of guides has a single maximum, to transform said distribution into a distribution with N (N≧2) maxima at the output of the array of guides.

4. A device according to claim 1, the N collection means having N output guiding optical structures.

5. A device according to any one of the preceding claims, the N collection means having N optical fibres.

6. A device according to one of the claims 1 to 4, the N collection means having N detection means for detecting signals $S_i$ and signal processing means for forming a signal representing a combination of signals $S_i$.

7. A device according to claim 6, the combination being a linear combination $\Sigma\lambda_i S_i$.

8. A device according to claim 6, comprising two collection means, the combination $\Sigma\lambda_i S_i$ being proportional to the difference $S_1-S_2$.

9. A device according to claim 8, comprising the signal processing means making it also possible to form a signal representative of the quantity $(S_1-S_2)/(S_1+S_2)$.

10. A device according to claim 5, comprising reflectors positioned in front of the input of at least one of the optical fibres permitting the reflection of stray light in such a way that the stray light is not introduced into said optical fibre.

11. A device according to claim 5, comprising each optical fibre of the device being inserted into a hole made in the first part.

12. A device according to one of the claims 1 to 4, comprising the second part of the device being weighted or ballasted.

13. A device according to claim 12, comprising the mobile part being weighted or ballasted at the second end.

14. A device according to claim 13, comprising two weighting loads being placed on either side of the second end of the second part.

15. A device according to claim 14, comprising the weighting loads being traversed by holes.

16. A device according to one of the claims 1 to 4, also having means for compensating the deformations of the second part in a second direction (z) different from the first direction (y).

17. A device according to claim 16, comprising the means for compensating the deformations of the second part having at least one arm connecting the second end of the second part and the first part of the device, said at least one arm having flexibility in the first direction (y) not to impede the displacement of the second part in said first direction (y) and rigidity in the second direction (z) to limit the deformations of the second part in said second direction.

18. A device according to claim 17, wherein the at least one compensating arm is connected to the first part positioned laterally with respect to the second part, or to the first part facing the second end of said second part.

19. A device according to claim 16, comprising the first direction (y) and second direction (z) being perpendicular to one another.

20. A device according to claim 17, comprising two arms.

21. A device according to claim 20, comprising the second part having a symmetry with respect to a median plane, the two arms being symmetrical to one another with respect to said median plane.

22. A device according to claim 17, comprising each of the at least one arm having two segments substantially perpendicular to one another.

23. A device according to claim 17, comprising each of the at least one arm having a U-shaped body with two lateral branches, with a branch added to each lateral branch of the U-shaped body and being substantially perpendicular thereto.

24. A device according to claim 17, comprising the at least one arm being straight.

25. An optomechanical sensor incorporating a device according to one of the claims 1 to 4.

26. An optical switch incorporating a device according to one of the claims 1 to 4 and means for controlling the second part.

* * * * *